(12) United States Patent
Yoshida et al.

(10) Patent No.: US 7,976,037 B2
(45) Date of Patent: Jul. 12, 2011

(54) FRONT VEHICLE BODY STRUCTURE

(75) Inventors: Hiroyuki Yoshida, Wako (JP);
Tomomasa Machida, Wako (JP);
Takahiro Echigo, Wako (JP); Shinya Suzuki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/675,932

(22) PCT Filed: Sep. 29, 2008

(86) PCT No.: PCT/JP2008/068119
§ 371 (c)(1),
(2), (4) Date: Mar. 12, 2010

(87) PCT Pub. No.: WO2009/051026
PCT Pub. Date: Apr. 23, 2009

(65) Prior Publication Data
US 2010/0231005 A1    Sep. 16, 2010

(30) Foreign Application Priority Data
Oct. 17, 2007   (JP) ................ P2007-270699

(51) Int. Cl.
*B62D 21/11*    (2006.01)
(52) U.S. Cl. .............................. 280/124.109
(58) Field of Classification Search ........... 280/124.109, 280/781, 785, 788; 180/311, 312
See application file for complete search history.

(56) References Cited

U.S. PATENT DOCUMENTS

| | | | | |
|---|---|---|---|---|
| 5,074,374 A | * | 12/1991 | Ohtake et al. ............ | 180/312 |
| 5,685,599 A | * | 11/1997 | Kitagawa ................ | 296/204 |
| 5,879,026 A | * | 3/1999 | Dostert et al. ........... | 280/781 |
| 6,390,224 B1 | * | 5/2002 | Yoshida ................. | 180/312 |
| 6,733,021 B1 | * | 5/2004 | Ziech et al. ......... | 280/124.109 |
| 6,866,295 B2 | * | 3/2005 | Ziech et al. .............. | 280/785 |
| 7,380,829 B2 | * | 6/2008 | Kishima ................ | 280/781 |
| 7,520,514 B2 | | 4/2009 | Ogawa et al. | |
| 2006/0082121 A1 | | 4/2006 | Kakuta et al. | |

FOREIGN PATENT DOCUMENTS

| | | |
|---|---|---|
| DE | 102006047511 | 4/2007 |
| DE | 1020060475611 | 4/2007 |
| EP | 1731409 A1 | 12/2006 |
| JP | 2-085667 U | 7/1990 |
| JP | 2000-238656 A | 9/2000 |

* cited by examiner

*Primary Examiner* — Paul N Dickson
*Assistant Examiner* — Robert A Coker
(74) *Attorney, Agent, or Firm* — Carrier Blackman & Associates, P.C.; William D. Blackman; Joseph P. Carrier

(57) ABSTRACT

Front vehicle body structure (10) includes a front sub frame (16) disposed under and fixedly connected to left and right side frames (11, 12), and a steering gear box (18) is mounted on the front sub frame to extend transversely along the width of the vehicle body. The body structure also has support portions (44, 45, 46) provided in left-right symmetrical arrangement on the front sub frame, and the steering gear box is mounted on the support portions via respective bushes.

4 Claims, 4 Drawing Sheets

FRONT VEHICLE BODY STRUCTURE

TECHNICAL FIELD

The present invention relates to front vehicle body structures where a steering gear box is provided on a front sub frame disposed under left and right side frames.

BACKGROUND ART

Among the conventionally-known front vehicle body structures are ones where a front sub frame disposed under and fixedly connected to left and right side frames and front suspensions are attached to left and right end portions of the front sub frame. In such front vehicle body structures, a power source (engine) is disposed forwardly of the front sub frame, and the power source is connected, via a support member, to a substantial middle region of the front sub frame so that the power source is supported by the front sub frame (see, for example, Japanese Patent Application Laid-Open Publication No. 2000-238656). According to the front vehicle body structure disclosed in the 2000-238656 publication, when front wheels are braked during travel of the vehicle, loads are applied, in a width direction of the vehicle body, from the front suspensions to the front sub frame. Further, in order to bear the loads applied from the front suspensions and support the power source, a cross member is attached to the front sub frame to secure a sufficient rigidity of the front sub frame.

Further, in some of the conventionally-known front vehicle body structures, a steering gear box is mounted to the front sub frame by means of a combination of fastening bands and fixing bushes, or only by means of a plurality of fixing bushes.

With the conventionally-known front vehicle body structures, loads applied from the front suspensions to steering tie rods due to braking of left and right front wheels can be borne by steering-gear-box mounting members, such as the fixing bushes. However, because a steering gear pinion and electric assisting motor are provided on an end portion of one of left and right sides of the steering gear box, it is difficult to position the mounting members, such as the fixing bushes, in left-right symmetrical relation to one another. Thus, the left and right tie rods tend to move different amounts when loads are applied from the front suspensions to the steering tie rods. Therefore, it has been considered difficult to achieve same toe angle changes between left and right wheels caused by braking loads.

Further, with the front vehicle body structure disclosed in the 2000-238656 publication, it is necessary to provide a cross member on the front sub frame in order for the front sub frame to have a sufficient rigidity for bearing loads applied from the front suspensions and supporting the power source. The provision of the cross member on the front sub frame undesirably increases the number of necessary component parts, which would impede enhancement of productivity.

DISCLOSURE OF THE INVENTION

It is therefore a first object of the present invention to provide an improved front vehicle body structure which can minimize a difference in toe angle change between left and right wheels caused by braking loads, and which can secure a sufficient rigidity of the front sub frame without increasing the number of necessary component parts.

In order to accomplish the above-mentioned object, the present invention provides an improved front vehicle body structure, which comprises: a front sub frame disposed under and fixed to left and right side frames, a steering gear box being mounted on the front sub frame to extend in a vehicle width direction; and at least three support portions provided in left-right symmetrical arrangement on the front sub frame, the steering gear box being mounted on the support portions via bushes.

Because the steering gear box is mounted on the support portions provided in left-right symmetrical relation to each other, loads applied from left and right lower arms of left and right suspensions to the front sub frame can be borne uniformly by the steering gear box. Thus, when loads are applied from the left and right suspensions to left and right tie rods, the left and right tie rods can be caused to move the same amount. As a result, the present invention can minimize a difference in toe angle change between left and right wheels caused by braking loads. Further, because the loads applied from the left and right lower arms to the front sub frame can be borne uniformly by the steering gear box, the steering gear box can function also as a reinforcing member. Thus, there is no need to provide a cross member as a separate reinforcing member, so that the present invention can secure a sufficient rigidity of the front sub frame without increasing the number of necessary component parts.

Preferably, the support portions comprise left, right and middle support portions, the left and right support portions being provided in left-right symmetrical relation to each other with respect to the middle support portion.

In a preferred form, the left and right lower arms of the left and right suspensions are connected to left and right lower-arm mounting portions, respectively, of the front sub frame, the left and right lower-arm mounting portions being located near where the front sub frame is fixed to the left and right side frames. In this way, the left and right lower-arm mounting portions can be reinforced with the left and right side frames, so that a sufficient rigidity of the left and right lower-arm mounting portions can be secured.

In an embodiment, the middle support portion is located at a substantial middle position, in a left-right direction, of the vehicle body, and the front vehicle body structure further includes a support member connected to the front sub frame to be located forwardly of the middle support portion for supporting a power source. Thus, a load applied from the support member to the front sub frame can be efficiently transmitted to the middle support portion. Because the steering gear box is mounted on the middle support portion, the load transmitted to the middle support portion can be efficiently borne by the steering gear box.

BEST MODE FOR CARRYING OUT THE INVENTION

In the following description, the terms "front", "rear", "left" and "right" are used to refer to directions as viewed from a human operator or driver.

Figure 1:
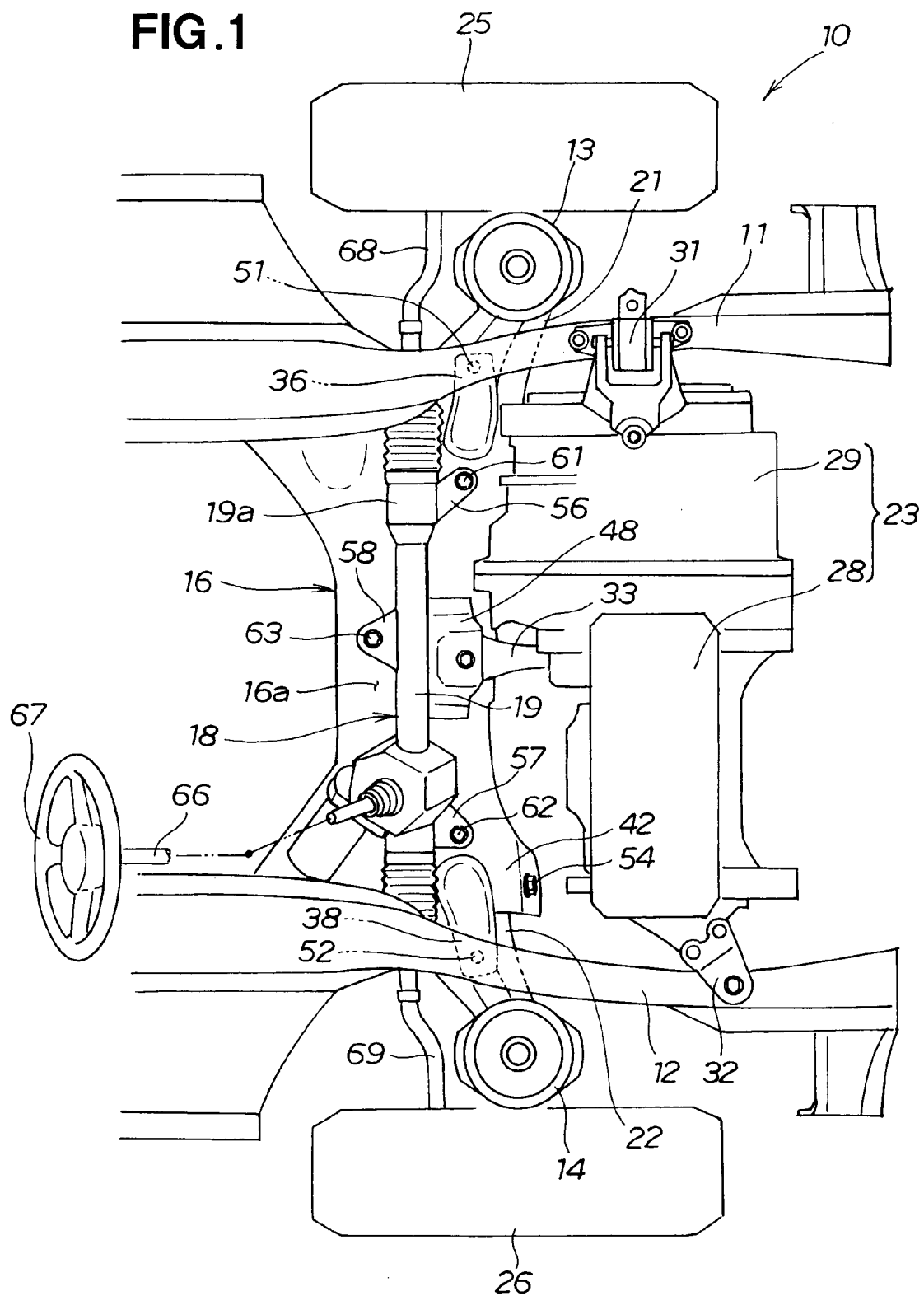
FIG. 1 is a plan view showing a front vehicle body structure according to an embodiment of the present invention.

FIG. 1 is a plan view showing a front vehicle body structure 10 according to an embodiment of the present invention. The front vehicle body structure 10 includes: left and right side frames 11 and 12; a left suspension 13 disposed laterally outwardly of the left side frame 11; a right suspension 14 disposed laterally outwardly of the right side frame 12; a front sub frame 16 disposed under and fixedly connected to the left and right side frames 11 and 12; and a steering gear box 18 mounted on an upper portion 16a of the front sub frame 16.

Further, in the front vehicle body structure 10, a left lower arm 21 of the left suspension 13 is connected to a left end portion of the front sub frame 16, a right lower arm 22 of the right suspension 14 is connected to a right end portion of the front sub frame 16, and a power source 23 is provided in front of the front sub frame 16.

Left wheel 25 is mounted, via a hub (not shown), to a knuckle (not shown) of the left suspension 13. Right wheel 26 is mounted, via a hub (not shown), to a knuckle 27 of the right suspension 14.

The power source 23 is an engine/transmission unit transversely mounted between the left and right side frames 11 and 12 and comprising an engine 28 and a transmission 29.

The power source 23 is mounted to the left side frame 11 via a left mounting bracket 31 and to the right side frame 12 via a right mounting bracket 32, and it is connected to the front sub frame 16 via a support rod (support member) 33.

Figure 2:
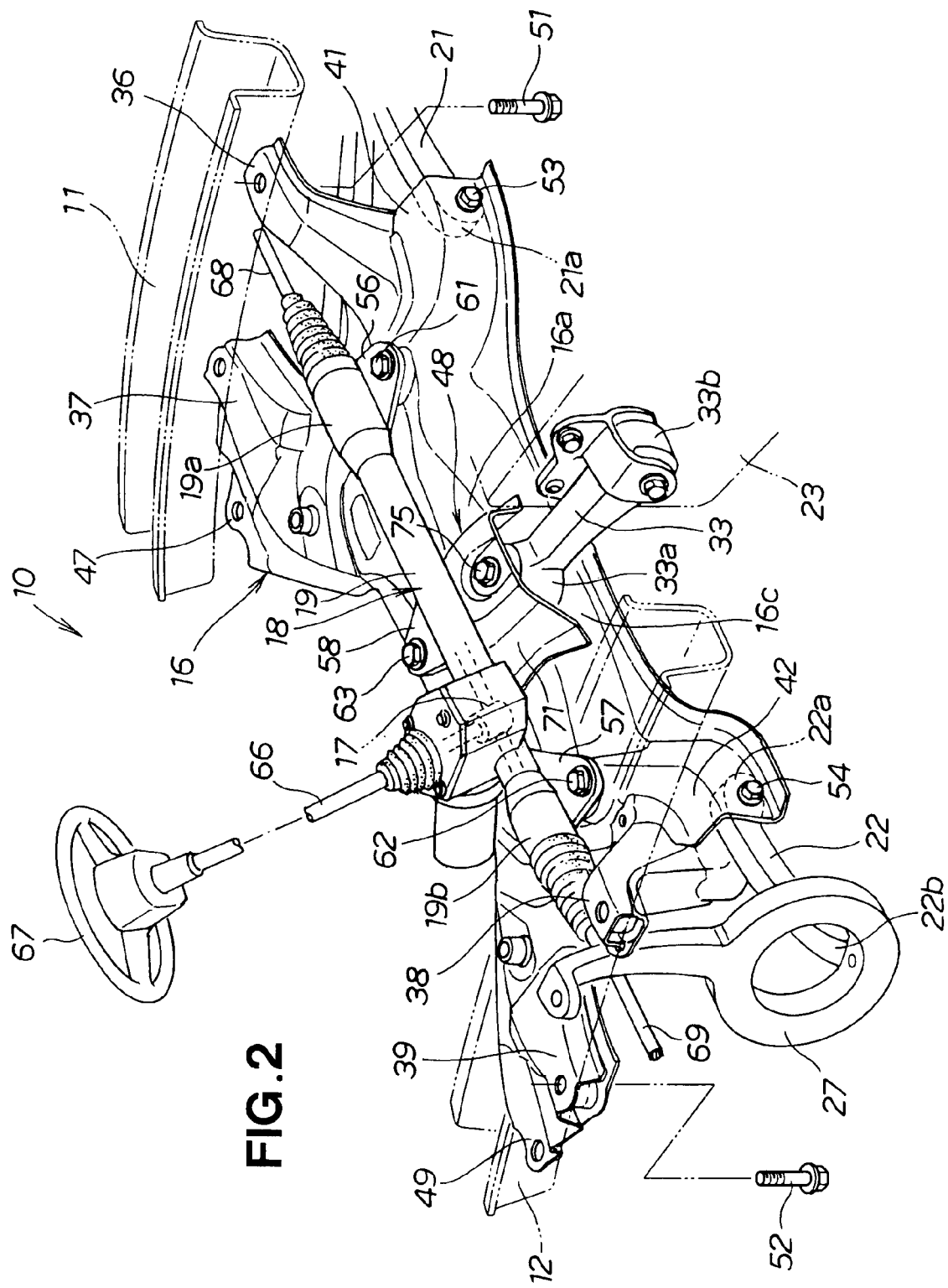
FIG. 2 is a perspective view of the front vehicle body structure of FIG. 1.
Figure 3:
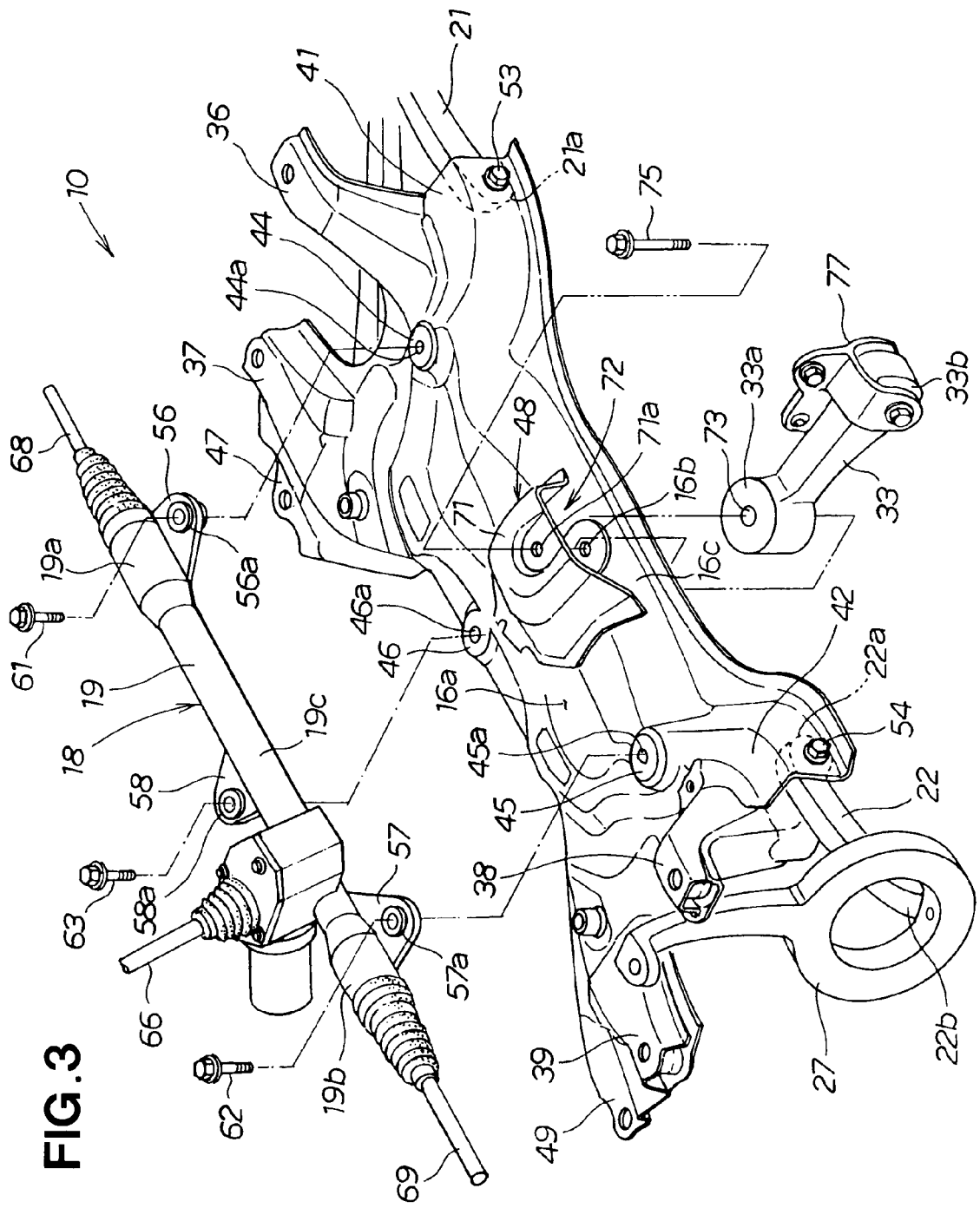
FIG. 3 is an exploded perspective view of the front vehicle body structure.

FIG. 2 is a perspective view of the front vehicle body structure 10, and FIG. 3 is an exploded perspective view of the front vehicle body structure 10.

The front sub frame 16, which has a substantially rectangular shape as viewed in plan, has a left front mounting portion 36 and left rear mounting portions 37 and 47 as portions connected to the left side frame 11 and a right front mounting portion 38 and right rear mounting portions 39 and 49 as portions connected to the right side frame 12. The front sub frame 16 also has a left arm mounting portion (i.e., left-lower-arm mounting portion) 41 provided near the left front mounting portion 36, and a right arm mounting portion (i.e., right-lower-arm mounting portion) 42 provided near the right front mounting portion 36. The front sub frame 16 also has a support portion 46, left and right support portions 44 and 45 and a connection section 48 that are all formed on the upper portion 16a. The support portions 44-46 are disposed in left-right symmetrical arrangement with the left and right support portions 44 and 45 positioned in left-right symmetrical relation to each other with respect to the support portion 46.

The left front mounting portion 36 extends toward the left side of the vehicle body with an upward slope, and the left rear mounting portion 37 extends toward the left side of the vehicle body. The left front mounting portion 36 and left rear mounting portion 37 are fixedly connected to the left side frame 11 by means of bolts 51.

The right front mounting portion 38 extends toward the right side of the vehicle body with an upward slope, and the right rear mounting portion 39 extends toward the right side of the vehicle body. The right front mounting portion 38 and right rear mounting portion 39 are fixedly connected to the right side frame 12 by means of bolts 52.

In the aforementioned manner, the front sub frame 16 is fixedly connected to the undersides of the left and right side frames 11 and 12.

The left lower arm 21, which constitutes part of the left front suspension 13 of FIG. 1, is vertically pivotably connected at its proximal end portion 21a to the left arm mounting portion 41 that is in turn mounted near the front side of the left front mounting portion 36. The left knuckle (not shown) is pivotably mounted on a distal end portion of the left lower arm 21, and the left wheel 25 of FIG. 1 is mounted, via the hub (not shown), to the left knuckle.

The right lower arm 22, which constitutes part of the right front suspension 14 of FIG. 1, is vertically pivotably connected at its proximal end portion 22a to the right arm mounting portion 42 that is in turn mounted near the front side of the right front mounting portion 38. The right knuckle 27 is pivotably mounted on a distal end portion 22b of the right lower arm 22, and the right wheel 26 of FIG. 1 is mounted, via the hub, to the right knuckle 27.

In the aforementioned manner, the left lower arm 21 is connected to the left arm mounting portion 41 of the front sub frame 16, and the right lower arm 22 is connected to the right arm mounting portion 42. Thus, when the left and right front wheels 25 and 26 are braked during travel of the vehicle, loads acting in the width direction of the vehicle body are applied to the front sub frame 16 by way of the left and right lower arms 21 and 22.

With the left arm mounting portion 41 mounted near the front side of the left front mounting portion 36 and the right arm mounting portion 42 mounted near the front side of the right front mounting portion 38, the left and right arm mounting portions 41 and 42 can be reinforced with the left and right side frames 11 and 12 and thus can have a sufficient rigidity.

Of the three support portions 44-46 provided on the upper portion 16a of the front sub frame 16, the left support portion 44 is disposed in front of a box body 19 that forms of a casing of the steering gear box 18. The left support portion 44 is an upwardly bulging portion located near the left front mounting portion 36 and left arm mounting portion 41. Mounting hole 44a is formed centrally through the left support portion 44, and a nut (not shown) is welded to the underside surface of the left support portion 44 coaxially with the mounting hole 44a.

The right support portion 45 is an upwardly bulging portion located near the right front mounting portion 38 and right arm mounting portion 42. Mounting hole 45a is formed centrally through the right support portion 45, and a nut (not shown) is welded to the underside surface of the right support portion 45 coaxially with the mounting hole 45a. Similarly to the left support portion 44, the right support portion 45 is disposed in front of the box body 19 of the steering gear box 18.

The middle support portion 46 is provided substantially on a longitudinal centerline of the vehicle body and thus is located in a substantial middle position, in the left-right direction, of the vehicle body. The middle support portion 46 has a mounting hole 46a formed centrally through, and a nut (not shown) is welded to the underside surface of the middle support portion 46 coaxially with the mounting hole 46a. The middle support portion 46 is disposed rearwardly of the box body 19 of the steering gear box 18.

The steering gear box 18 is mounted to the left and right support portions 44 and 45 and the middle support portion 46. The steering gear box 18 has: the box body 19 accommodating a steering gear 17 of FIG. 2 etc.; a left mounting piece 56 projecting toward the front of the vehicle body from a left end portion 19a of the box body 19; a right mounting piece 57 projecting toward the front of the vehicle body from a right end portion 19b of the box body 19; and a middle mounting piece 58 projecting toward the rear of the vehicle body from a middle portion 19c of the box body 19. The box body 19 is in the form of a cylindrical case.

Cylindrical bush 56a is fitted in a mounting hole of the left mounting piece 56. Bolt 61 is inserted through the cylindrical bush 56a and mounting hole 44a of the left support portion 44 and screwed into a nut (not shown) provide for the left support portion 44.

Cylindrical bush 57a is fitted in a mounting hole of the right mounting piece 57. Bolt 62 is inserted through the cylindrical bush 57a and mounting hole 45a of the right support portion 45 and screwed into a nut (not shown) provide for the right support portion 45.

Further, a cylindrical bush 58a is fitted in a mounting hole of the middle mounting piece 58. Bolt 63 is inserted through the cylindrical bush 58a and mounting hole 46a of the middle support portion 46 and screwed into a nut (not shown) provide for the middle support portion 46.

The steering gear box 18 (box body 19) is mounted transversely on the upper portion 16a of the front sub frame 16 via the bushes 56a, 57a and 58a. Steering wheel 67 is mounted on a steering shaft 66 extending from the steering gear box 18 (box body 19).

As the steering wheel 67 is turned, the left and right tie rods 68 and 69 move in the width direction of the vehicle, so that the left and right knuckles (only the right knuckle 27 is shown) pivot to change the orientation of the left and right front wheels 25 and 26 (see FIG. 1).

As noted above, the support portions 44-46 are disposed in left-right symmetrical arrangement on the front sub frame 16 with the left and right support portions 44 and 45 positioned in left-right symmetrical relation to each other with respect to the support portion 46, and the steering gear box 18 is mounted on these support portions 44-46. Thus, loads acting on the front sub frame 16 by way of the left and right lower arms 21 and 22 when the left and right front wheels 25 and 26 are braked can be borne uniformly by the steering gear box 18.

Thus, when loads are applied from the left and right front suspensions 13 and 14 to the left and right tie rods 68 and 69, the left and right tie rods 68 and 69 can be caused to move by the same amount, so that it is possible to minimize a difference in toe angle change between the left and right wheels caused by the braking loads.

Further, because loads acting on the front sub frame 16 by way of the left and right lower arms 21 and 22 can be borne uniformly by the steering gear box 18, the steering gear box 18 can function also as a reinforcing member. Thus, there is no need to provide a cross member as a separate reinforcing member, so that the instant embodiment can secure a sufficient rigidity of the front sub frame 16 without increasing the number of necessary component parts.

The connection section 48 is formed on the upper portion 16a of the front sub frame 16 and located forwardly of the middle support portion 46. The support member 33 is connected to the front sub frame 16 to be located forwardly of the middle support portion 46, so as to support the power source 23. The connection section 48 has an upper mounting bracket 71 located forwardly of the middle support portion 46, and has an accommodating space 72 formed between the mounting bracket 71 and the upper portion 16a. Mounting holes 71a and 16b are formed coaxially in the upper mounting bracket 71 and upper portion 16a, respectively, and a nut (not shown) is welded to the underside surface of the upper portion 16a coaxially with the mounting hole 16b.

To the connection section 48 located forwardly of the middle support portion 46 is fixedly connected a rear end portion 33a of the support rod 33 supporting the power source 23. Namely, a bolt 75 is inserted through a mounting hole 71a of the upper mounting bracket 71, mounting hole 73 of the rear end portion 33a and mounting hole 16b of the upper portion 16a and screwed into a nut (not shown). Thus, the rear end portion 33a of the support rod 33 connected to the connection section 48 is accommodated in the accommodating space 72.

The support rod 33 is connected at its front end portion 33b to the power source 23 via a mounting bracket 77. Thus, the power source 23 can be supported by a middle region of a front portion 16c of the front sub frame 16 via the support rod 33.

Because the connection section 48 is located forwardly of the middle support portion 46 as noted above, loads transmitted to the middle region of the front portion 16c of the front sub frame 16 can be delivered to the middle support portion 46 and efficiently borne by the steering gear box 18 (box body 19).

Figure 4A:
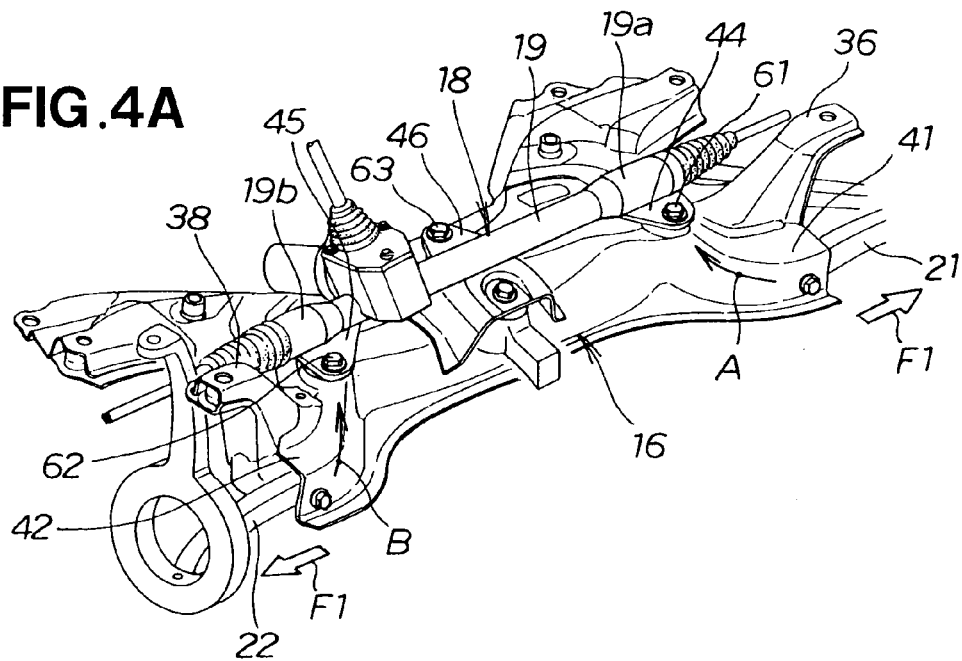
FIGS. 4A and 4B are views explanatory of how loads transmitted to a front sub frame are borne by a steering gear box in the embodiment of the present invention.
Figure 4B:
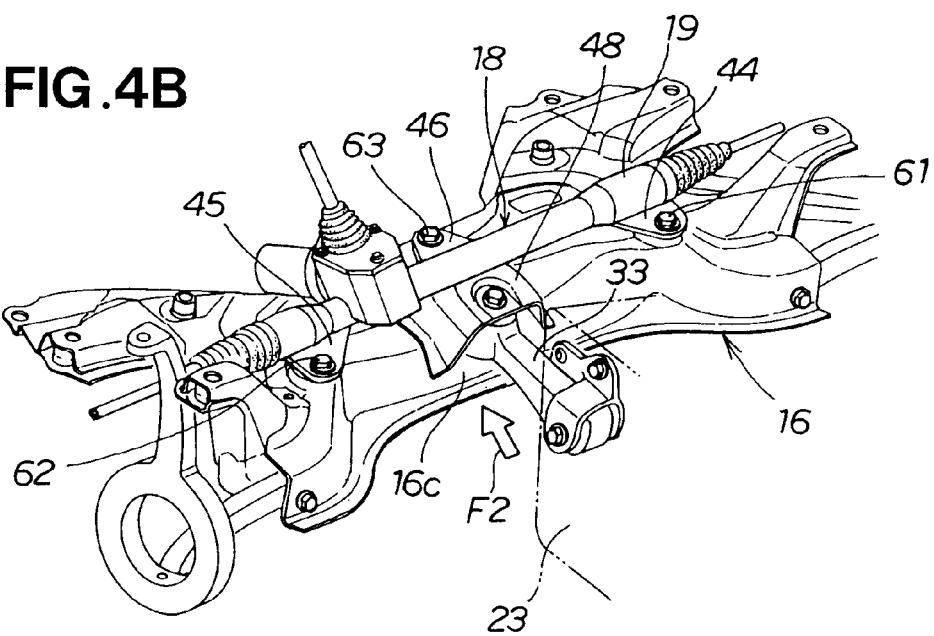

With reference to FIGS. 4A and 4B, the following paragraphs describe how loads transmitted to the front sub frame 16 of the front vehicle body structure 10 are borne in the instant embodiment.

When the left and right front wheels 25 and 26 are braked, a load F1 acts on (or is applied to) the left arm mounting portion 41 of the front sub frame 16 by way of the left lower arm 21 while a load F1 acts on (or is applied to) the right arm mounting portion 42 of the front sub frame 16 by way of the right lower arm 22, as shown in FIG. 4A.

With the left arm mounting portion 41 disposed near the front side of the left front mounting portion 36, the left arm mounting portion 41 is reinforced with the left side frame 11 (see FIG. 2). Thus, the load (reactive force) F1 applied to the left arm mounting portion 41 can be transmitted as indicated by arrow A. Part of the load (reactive force) F1 transmitted as indicated by arrow A is delivered to the steering gear box 18 by way of the left support portion 44 and borne by the steering gear box 18.

Similarly, with the right arm mounting portion 42 disposed near the front side of the right front mounting portion 38, the right arm mounting portion 42 is reinforced with the right side frame 12. Thus, the load (reactive force) F1 applied to the right arm mounting portion 42 can be transmitted as indicated by arrow B. Part of the load (reactive force) F1 transmitted as indicated by arrow B is delivered to the steering gear box 18 by way of the right support portion 45 and borne by the steering gear box 18.

Because the steering gear box 18 is mounted on the left and right support portions 44 and 45 and middle support portion 46 with the left and right support portions 44 and 45 positioned in left-right symmetrical relation to each other with respect to the support portion 46 as noted above, part of the loads (reactive force) F1 acting on the front sub frame 16 by way of the left and right lower arms 21 and 22 can be transmitted uniformly from the left and right end portions 19a and 19b.

Thus, when the loads F1 are applied from the left and right front suspensions 13 and 14 to the left and right tie rods 68 and 69, the left and right tie rods 68 and 69 can be caused to move by the same amount, so that it is possible to minimize a difference in toe angle between the left and right wheels 25 and 26 caused by the braking loads.

Further, because part of the loads F1 acting on the front sub frame 16 by way of the left and right lower arms 21 and 22 can be transmitted uniformly from the left and right end portions 19a and 19b and borne by the steering gear box 18. Consequently, the steering gear box 18 can function also as a reinforcing member. Thus, there is no need to provide a cross member as a separate reinforcing member, so that the instant embodiment can secure a sufficient rigidity of the front sub frame 16 without increasing the number of necessary component parts.

Further, when an impact load is applied to the front vehicle body structure in the front-to-rear direction of the vehicle body, part of the applied impact load is transmitted, as a load F2, to the support rod 33 by way of the power source 23, as shown in FIG. 4B. The load F2 transmitted to the support rod 33 is then transmitted to the middle region of the front portion 16c of the front sub frame 16 via the connection section 48.

Because the connection section 48 is located forwardly of the front side of the middle support portion 46, the load transmitted to the middle region of the front portion 16c is delivered to the middle support portion 46. Further, because the middle support portion 46 is a porting mounting thereon the steering gear box 18, the load transmitted to the middle region of the front portion 16c of the front sub frame 16 via the connection section 48 can be borne efficiently by the steering gear box 18. In this way, it is possible to secure a sufficient rigidity of the front sub frame 16.

The shapes of the front sub frame 16, steering gear box 18, left and right lower arms 21 and 22, support rod 33, left, right and middle support portions 44, 45 and 46, etc. are not limited to those illustrated and described above and may be modified as necessary.

Further, whereas the preferred embodiment has been described as having three support portions 44-46, the number of the support portions is not limited to three; for example, four such support portions may be provided as long as they are positioned in left-right symmetrical arrangement.

INDUSTRIAL APPLICABILITY

The front vehicle body structure of the present invention is well suited for use in automotive vehicles having a steering gear box provided on a front sub frame disposed under left and right side frames.

The invention claimed is:

1. A front vehicle body structure comprising:
   left and right side frames;
      a front sub frame disposed under and fixed to the left and right side frames,
      a steering gear box extending in a vehicle width direction; and
      at least three support portions, provided in left-right symmetrical arrangement on said front sub frame, for mounting the steering gear box,
   said support portions comprising left, right and middle support portions, the left and right support portions being provided in left-right symmetrical relation to each other with respect to the middle support portion,
      wherein the front sub frame includes left and right lower-arm mounting portions for mounting left and right lower arms for front suspensions, and left and right front-sub-frame mounting portions for mounting the front sub frame to the left and right side frames,
   wherein the lower-arm-mounting portions are provided forwardly of and close to the front-sub-frame mounting portions, and
      wherein the left and right support portions bulge upwardly and are located near the left and right lower-arm mounting portions, respectively.

2. The front vehicle body structure of claim 1, wherein the left and right support portions are located forwardly of a casing of the steering gear box, and the middle support portion is located rearwardly of the steering gear box.

3. The front vehicle body structure of claim 1, wherein the steering gear box is mounted on the at least three support portions via bushes.

4. The front vehicle body structure of claim 2, wherein the middle support portion is located at a substantially middle position, in a left-right direction, of the vehicle body, and the sub frame includes a support member mounted thereon for supporting a power source.

* * * * *